(12) United States Patent
Giffard-Burley

(10) Patent No.: US 12,462,322 B2
(45) Date of Patent: Nov. 4, 2025

(54) DIGITAL IMAGE WATERMARKING BY EMBEDDING IDENTIFIER BITS IN BLOCKS OF DIGITAL IMAGE

(71) Applicant: Wacom Co., Ltd., Saitama (JP)

(72) Inventor: Joss Daniel Giffard-Burley, Frome (GB)

(73) Assignee: Wacom Co., Ltd., Saitama (JP)

( * ) Notice: Subject to any disclaimer, the term of this patent is extended or adjusted under 35 U.S.C. 154(b) by 551 days.

(21) Appl. No.: 17/857,875

(22) Filed: Jul. 5, 2022

(65) Prior Publication Data

US 2024/0013335 A1      Jan. 11, 2024

(51) Int. Cl.
*G06T 1/00*       (2006.01)
*G06T 3/60*       (2024.01)

(52) U.S. Cl.
CPC .......... *G06T 1/0064* (2013.01); *G06T 1/0028* (2013.01); *G06T 3/60* (2013.01); *G06T 2201/0052* (2013.01); *G06T 2201/0061* (2013.01); *G06T 2201/0064* (2013.01)

(58) Field of Classification Search
CPC ....... G06T 1/0064; G06T 1/0028; G06T 3/60; G06T 2201/0052; G06T 2201/0061; G06T 2201/0064; G06T 1/005
See application file for complete search history.

(56) References Cited

U.S. PATENT DOCUMENTS

2019/0253254 A1\*   8/2019   Brownlee ........... G06K 19/0725
2021/0217129 A1\*   7/2021   Deshmukh ............... G06T 1/005
2021/0374734 A1\*   12/2021  Giffard-Burley ...........................
                                                        G06Q 20/3825

OTHER PUBLICATIONS

Kashyap et al., "Image Watermarking Using 3-Level Discrete Wavelet Transform (DWT)," *I.J. Modern Education and Computer Science* 3:50-56, 2012, 7 pages.
Perwej et al., "Copyright Protection of Digital Images Using Robust Watermarking Based on Joint DLT and DWT," *International Journal of Scientific & Engineering Research* 3(6), Jun. 2012, 10 pages.
Sporny et al., "Decentralized Identifiers (DIDs) v1.0—Core architecture, data model, and representations," W3C Proposed Recommendation Aug. 3, 2021, 109 pages.
International Search Report and Written Opinion, mailed May 4, 2023, for International Patent Application No. PCT/US 23/62306. (12 pages).

\* cited by examiner

*Primary Examiner* — Christopher Wait
(74) *Attorney, Agent, or Firm* — Seed Intellectual Property Law Group LLP

(57) ABSTRACT

Provided is a method and apparatus for digital image watermarking. In the method and apparatus, a computer system receives a first image and receive information for embedding in the first image. The computer system preprocesses the first image to produce a preprocessed first image and preprocesses the information by at least channel-encoding the information to produce preprocessed information including a plurality of sets of bits. The computer system embeds the preprocessed information in the preprocessed first image by at least selecting a plurality of blocks of the preprocessed first image and embedding in each block of the plurality of blocks a respective set of bits of the plurality of sets of bits. Each set of bits of the plurality of sets of bits is embedded in a minimum number of blocks of the plurality of blocks, where the minimum number of blocks is greater than one.

22 Claims, 14 Drawing Sheets

DIGITAL IMAGE WATERMARKING BY EMBEDDING IDENTIFIER BITS IN BLOCKS OF DIGITAL IMAGE

BACKGROUND

Technical Field

This application is directed to embedding a watermark in an image and decoding an image to recover an embedded watermark.

Description of the Related Art

Images are oftentimes original works that are subject to protections. Images are being shared and publicly disseminated to wider audiences with increasing regularity. In the sharing and dissemination, unauthorized uses of the images occur. For example, an image may be used in a manner that has not been authorized by the creator of the image or a right holder to an interest in the image. Preventing unauthorized use often requires establishing that the utilized image is in fact derived or copied from the image to which protections apply.

BRIEF SUMMARY

In an embodiment, a computer system includes a processor and memory having stored thereon executable instructions that, when executed by the processor, cause the processor to receive a first image and receive information for embedding in the first image, preprocess the first image to produce a preprocessed first image, preprocess the information by at least channel-encoding the information to produce preprocessed information including a plurality of sets of bits, embed the preprocessed information in the preprocessed first image by at least selecting a plurality of blocks of the preprocessed first image and embedding in each block of the plurality of blocks a respective set of bits of the plurality of sets of bits. In an embodiment, each set of bits of the plurality of sets of bits is embedded in a minimum number of blocks of the plurality of blocks, where the minimum number of blocks is greater than one.

In an embodiment, the executable instructions cause the processor to preprocess the first image by rotating the first image by 90 degrees, 180 degrees or 270 degrees. In an embodiment, the executable instructions cause the processor to preprocess the first image by performing feature detection on the first image to generate a plurality of feature vectors, determining an average feature vector of the plurality of feature vectors and rotating the first image to a quadrant that minimizes an angle between the average feature vector and a central axis of the first image.

In an embodiment, the executable instructions cause the processor to preprocess the first image by obtaining the preprocessed first image as a luma channel component of the first image. In an embodiment, wherein the executable instructions cause the processor to frequency-transform the plurality of blocks to generate a plurality of frequency-transformed blocks. In an embodiment, the executable instructions cause the processor to embed in each block of the plurality of blocks a respective set of bits of the plurality of sets of bits by embedding in each frequency-transformed block of the plurality of frequency-transformed blocks the respective set of bits of the plurality of sets of bits and in response to embedding the plurality of sets of bits, inversely transforming the plurality of frequency-transformed blocks to a spatial domain.

In an embodiment, the executable instructions cause the processor to embed in a first block of the plurality of blocks a first set of bits of the plurality of sets of bits by at least selecting a first bit of the first set of bits, selecting a pixel position in the first block, identifying a level of the pixel position and quantizing the level of the pixel position depending on a logical state of the first bit. In an embodiment, the executable instructions that cause the processor to quantize the level of the pixel position depending on the logical state of the first bit cause the processor to in response to determining that the logical state of the first bit is a logical zero, quantize the level to one of: an odd value or an even value and in response to determining that the logical state of the first bit is a logical one, quantize the level to the other of: the odd value or the even value.

In an embodiment, the executable instructions cause the processor to divide the quantized level of the pixel position by a robustness factor. In an embodiment, the executable instructions cause the processor to generate a watermarked image based on embedding the preprocessed information in the preprocessed first image and cause the watermarked image to be output for distribution. In an embodiment, the information is a decentralized identifier defined by the World Wide Web Consortium (W3C) Proposed Recommendation 1.0.

In an embodiment, the executable instructions cause the processor to preprocess the first image by configuring an image processing pipeline including a plurality of image preprocessing stages, selecting one or more of the plurality of image preprocessing stages depending on contextual information associated with the first image, a property of the first image, an image type associated with the first image, or a preprocessing configuration and preprocessing the first image through the selected one or more of the plurality of image preprocessing stages to produce the preprocessed first image.

In an embodiment, the executable instructions cause the processor to preprocess the information by configuring an information processing pipeline including a plurality of information preprocessing stages, selecting one or more of the plurality of information preprocessing stages depending on a type of the information or a preprocessing configuration and preprocessing the information through the selected one or more of the plurality of information preprocessing stages to produce the preprocessed information.

In an embodiment, a method includes receiving a first image and receiving information for embedding in the first image, preprocessing the first image to produce a preprocessed first image, preprocessing the information by at least channel-encoding the information to produce preprocessed information including a plurality of sets of bits, embedding the preprocessed information in the preprocessed first image by at least selecting a plurality of blocks of the preprocessed first image and embedding in each block of the plurality of blocks a respective set of bits of the plurality of sets of bits. In an embodiment, each set of bits of the plurality of sets of bits is embedded in a minimum number of blocks of the plurality of blocks, where the minimum number of blocks is greater than one.

In an embodiment, preprocessing the first image includes performing feature detection on the first image to generate a plurality of feature vectors, determining an average feature vector of the plurality of feature vectors and rotating the first image to a quadrant that minimizes an angle between the average feature vector and a central axis of the first image. In an embodiment, preprocessing the first image includes obtaining the preprocessed first image as a luma channel component of the first image. In an embodiment, the method includes embedding in a first block of the plurality of blocks a first set of bits of the plurality of sets of bits by at least selecting a first bit of the first set of bits, selecting a pixel position in the first block, identifying a level of the pixel position and quantizing the level of the pixel position depending on a logical state of the first bit.

In an embodiment, quantizing the level of the pixel position depending on the logical state of the first bit includes in response to determining that the logical state of the first bit is a logical zero, quantizing the level to one of: an odd value or an even value and in response to determining that the logical state of the first bit is a logical one, quantizing the level to the other of: the odd value or the even value. In an embodiment, the method includes divide the quantized level of the pixel position by a robustness factor.

In an embodiment, preprocessing the first image includes configuring an image processing pipeline including a plurality of image preprocessing stages, selecting one or more of the plurality of image preprocessing stages depending on contextual information associated with the first image, a property of the first image, an image type associated with the first image or a preprocessing configuration and preprocessing the first image through the selected one or more of the plurality of image preprocessing stages to produce the preprocessed first image.

In an embodiment, preprocessing the information includes configuring an information processing pipeline including a plurality of information preprocessing stages, selecting one or more of the plurality of information preprocessing stages depending on a type of the information or a preprocessing configuration and preprocessing the information through the selected one or more of the plurality of information preprocessing stages to produce the preprocessed information.

DETAILED DESCRIPTION

Provided herein is the use of digital watermarking to embed identifying information in an image, which may be an original work or an artwork. The identifying information may be retrieved even if the image is modified, such that a link may be created between the image and a record of the identifying information. The techniques allow for artists and original work creators, among others, to share their work on a public platform. In the event that an image is used in an unauthorized way (e.g., as part of a media campaign without permission), a link between the image and misuse may be created.

Figure 1:
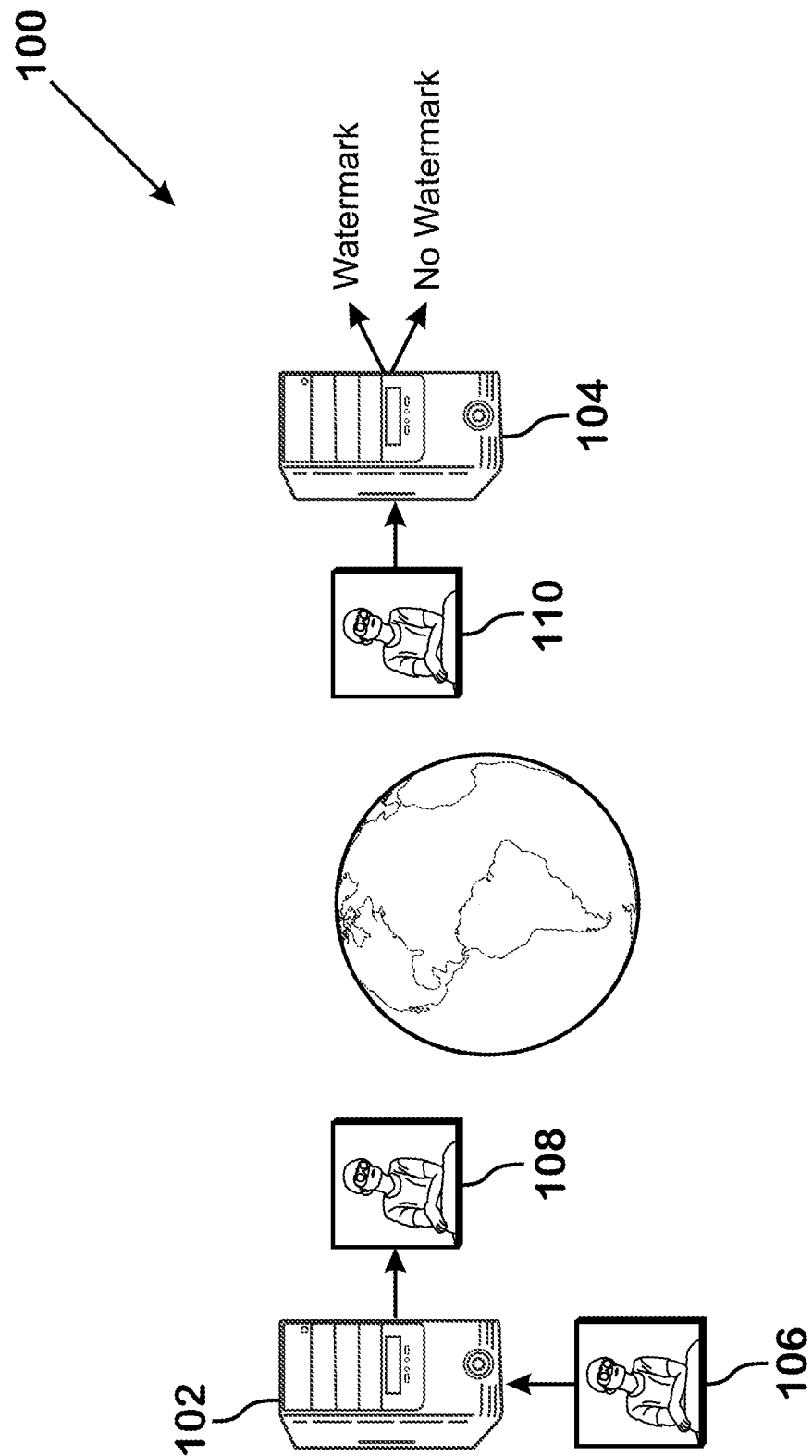
FIG. 1 shows an example of an environment for digitally encoding and retrieving a watermark.

FIG. 1 shows an example of an environment 100 for digitally watermarking an image. The environment 100 includes first and second computer systems 102, 104. The first computer system 102 receives a first image 106 and processes the first image 106 to generate a watermarked image 108. The first image 106 may be an artwork or an original work, among others. The first image 106 may be sought to be disseminated, distributed or shared. However, the owner or copyright holder of the first image 106 may seek to prevent unauthorized uses of the first image 106. For example, the owner may seek to prevent unauthorized use of the first image 106 in a media campaign, among other uses.

The first computer system 102 receives the first image 106 and processes and operates on the first image 106 to generate a watermarked image 108 therefrom. The watermarked image 108 is embedded or encoded with information or data (a watermark) that is retrievable to identify the watermarked image 108. The watermarked image 108 may be disseminated, distributed or shared. When the watermarked image 108 is shared, the watermarked image 108 may undergo editing, cropping, compression or format conversion, among others, resulting in a second image 110. Alternatively, the watermarked image 108 may not be altered during distribution and, thus, the second image 110 may be the same as the watermarked image 108. The second computer system 104 receives the second image 110. The second computer system 104 processes the second image 110 to determine whether the second image 110 is encoded or embedded with the watermark. For example, the second computer system 104 may decode the second image 110 and may determine whether the watermark is present in the second image 110.

If the watermark is present in the second image 110, then it may be established that the second image 110 was sourced from the first image 108. For example, the second image 110 may be a copy of the watermarked image 108. Alternatively, the watermarked image 108 or a portion thereof may have been cropped or may have undergone format conversion, among others, to produce the second image 110 or a portion thereof.

A digital watermark is preferably inserted in the watermarked image 108 so as to be imperceivable to the human eye. The visual artifacts associated with the watermark are preferably immersed in (or blended with) the watermarked image 108 so that they are not noticeable by the human eye. While the watermark modifies the first image 106 to produce the watermarked image 108, the modification is sought to be in features of the watermarked image 108 other than those on which the human eye concentrates or focuses. Accordingly, the watermarked image 108 may be sought to be perceived by a human viewer as a replica of the first image 106 whereas, in fact, the watermarked image 108 includes identifying information that is not part of the first image 106.

In addition, a watermark is sought to be robust. Thus, the watermark survives cropping and format conversion, among other actions taken to produce the second image 110 from the watermarked image 108. Further, a watermark may be applied using frequency-domain or time-domain processing or preprocessing.

Figure 2A:
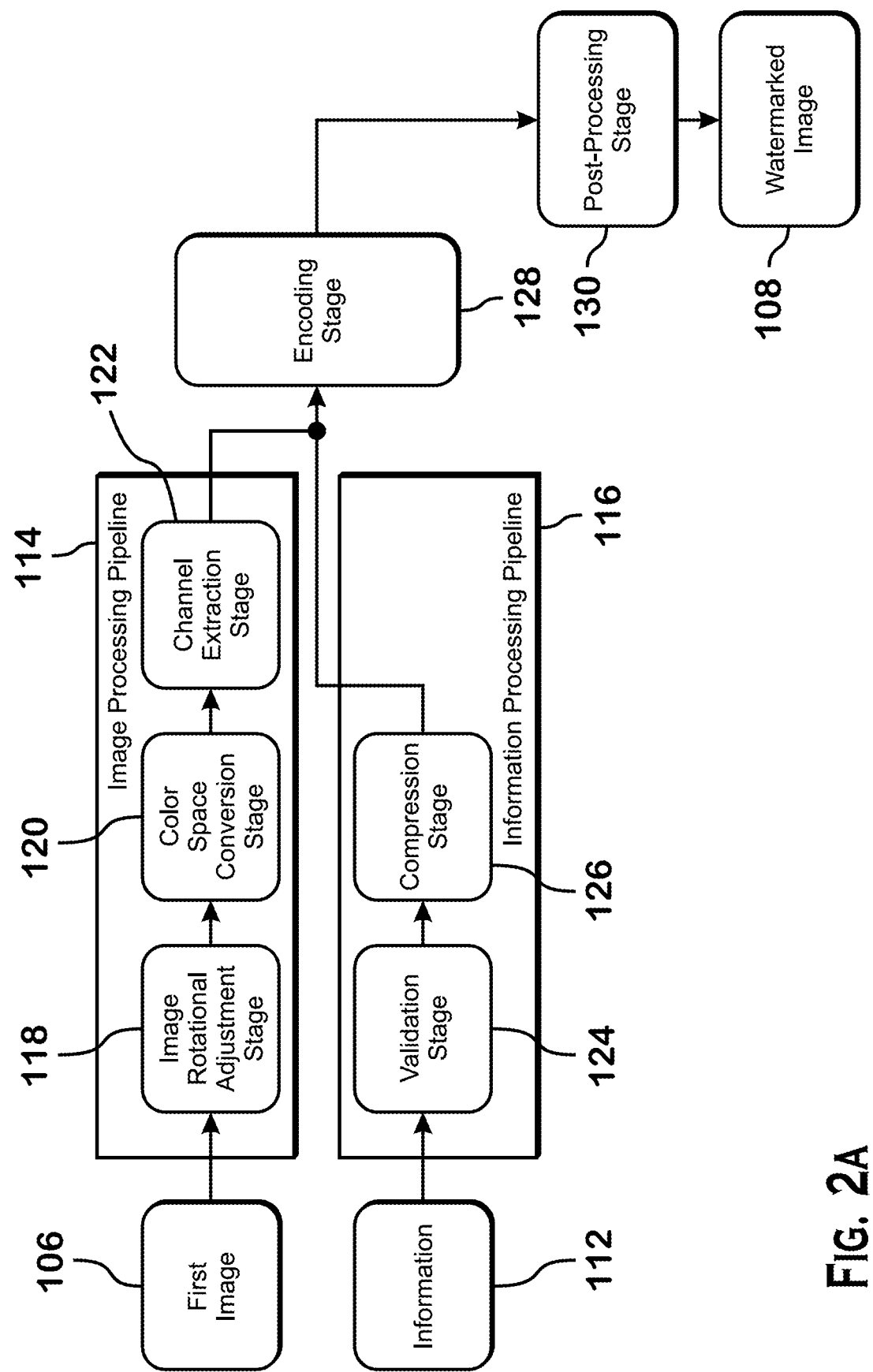
FIG. 2A shows stages of watermarking a first image.

FIG. 2A shows stages of watermarking the first image 106. The stages of watermarking the first image 106 may be performed by the first computer system 102 as described herein. The stages include preprocessing stages that are performed as part of preprocessing ahead of encoding the first image 106. The first computer system 102 receives the first image 106 and information 112 to be embedded in the first image 106 using a watermark.

The first computer system 102 performs various preprocessing stages of an image processing pipeline 114 on the first image 106. The first computer system 102 also performs various preprocessing stages of an information processing pipeline 116 on the information 112. The image processing pipeline 114 includes an image rotational adjustment stage 118, a color space conversion stage 120 and a channel extraction stage 122. The information processing pipeline 116 includes a validation stage 124 and a compression stage 126. The compression stage 126 as described herein includes channel encoding (e.g., convolutional encoding) of the information 112.

The preprocessed image output by the image processing pipeline 114 and the preprocessed information output by the information processing pipeline 116 are provided to an encoding stage 128. The encoding stage 128 embeds the preprocessed information in the preprocessed image. The encoding stage 128 generates image data including the preprocessed image having the preprocessed information embedded therein. The encoding stage 128 outputs the image data to a post-processing stage 130. The post-processing stage 130 may perform "reverse" operations as those performed in the image processing pipeline 114. The post-processing stage 130 may include channel combination, color space reconversion and rotational adjustment. For example, the rotational adjustment may reverse the image rotational adjustment performed as part of the image rotational adjustment stage 118. The post-processing stage 130 outputs the watermarked image 108.

It is noted that various stages of the image and information processing pipelines 114, 116 may be removed depending on the image and the desired watermarking. For example, in an embodiment, the image rotational adjustment stage 118 may be forgone. Instead, the first image 106 may be processed through the image processing pipeline 114 without changing the orientation of the first image 106. The first image 106 may be processed without changing its orientation or rotating it to be upside down, for example.

Further, stages may be added to the image or information processing pipelines 114, 116. For example, a feature detection stage or an image normalization stage may be added to the image processing pipeline 114. For example, the feature detection stage may be used by the first computer system 102 to identify a category of the first image 106. The category may be one or more of multiple categories that include a photo or line drawing, among others. The encoding technique used in the encoding stage 128 may be changed or adjusted depending on the identified category. Further, the stages included in the image processing pipeline 114 may be changed depending on the image category. In addition, contextual information may inform the stages used as part of the image processing pipeline 114. Contextual information may include the type of software used to generate the first image 106. For example, if the image is generated using one type of software, color space conversion may be dispensed with.

The first computer system 102 may configure the image processing pipeline 114. The first computer system 102 may selectively add a plurality of image preprocessing stages to the image processing pipeline 114. The first computer system 102 may determine the plurality of image preprocessing stages to add to the image processing pipeline 114 depending on contextual information associated with the first image (such as a software used to generate the first image), a property of the first image (such as the color space of the first image, a size of the first image or dimension of the first image), an image type associated with the first image (such as whether the first image represents a line drawing or a photograph or the type of photograph) or a preprocessing configuration (such as a user configuration of a level of a computational intensity to be used for performing image preprocessing). For example, if computational intensity is selected to be limited, the first computer system 102 may minimize the number of preprocessing stage and vice-versa. The first computer system 102 may then preprocess the first image through the plurality of image preprocessing stages to produce a preprocessed first image.

In the information processing pipeline 116, the validation stage 124 may be forgone if the information 112 does not have a specific format to be validated. As described herein, the validation stage 124 validates that the information is in the form of a decentralized identifier (DID). However, if the first image 106 is to be watermarked with information having any format, then the validation stage 124 may not be used to ensure that the information is a DID. In addition, the compression stage 126 may be forgone if it is sought to embed the information as is without compression.

The first computer system 102 may configure the information processing pipeline 116 according to a modular approach. The first computer system 102 may selectively add a plurality of information preprocessing stages to the information processing pipeline 116. The first computer system 102 may determine the plurality of information preprocessing stages to add to the information processing pipeline 116 depending on a type of the information or the preprocessing configuration. The first computer system 102 may then preprocess the information through the plurality of the information preprocessing stages to produce the information first image. The type of the information may be a format of the information. If the information is to have a specific format, the first computer system 102 may configure the information processing pipeline 116 with a preprocessing stage to validate the information.

Use of a pipeline-based technique is advantageous in that watermark encoding and decoding may be adapted to changing requirements and environments. Various preprocessing and post-processing stages may be added or removed to accommodate different image types, information types and/or encoding or decoding requirements.

Figure 2B:
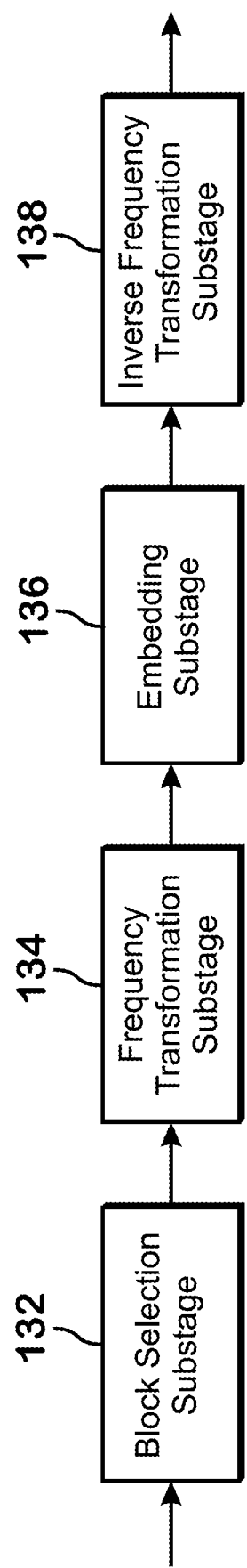
FIG. 2B shows substages of an encoding stage.
Figure 3A:
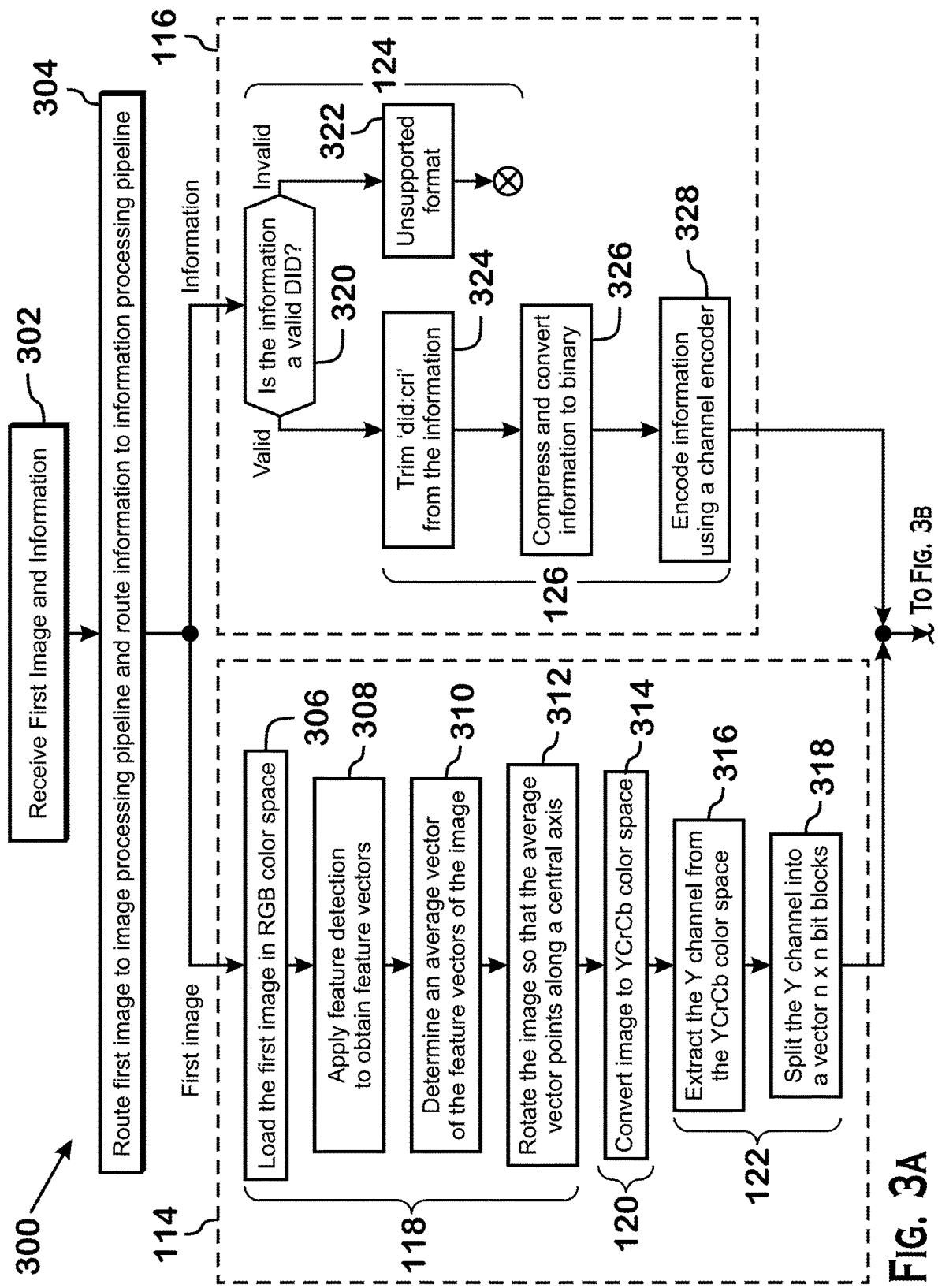
FIGS. 3A-3D show a flow diagram of a method of preprocessing the first image through an image processing pipeline, preprocessing information through an information processing pipeline and operation of the encoding stage.
Figure 3B:
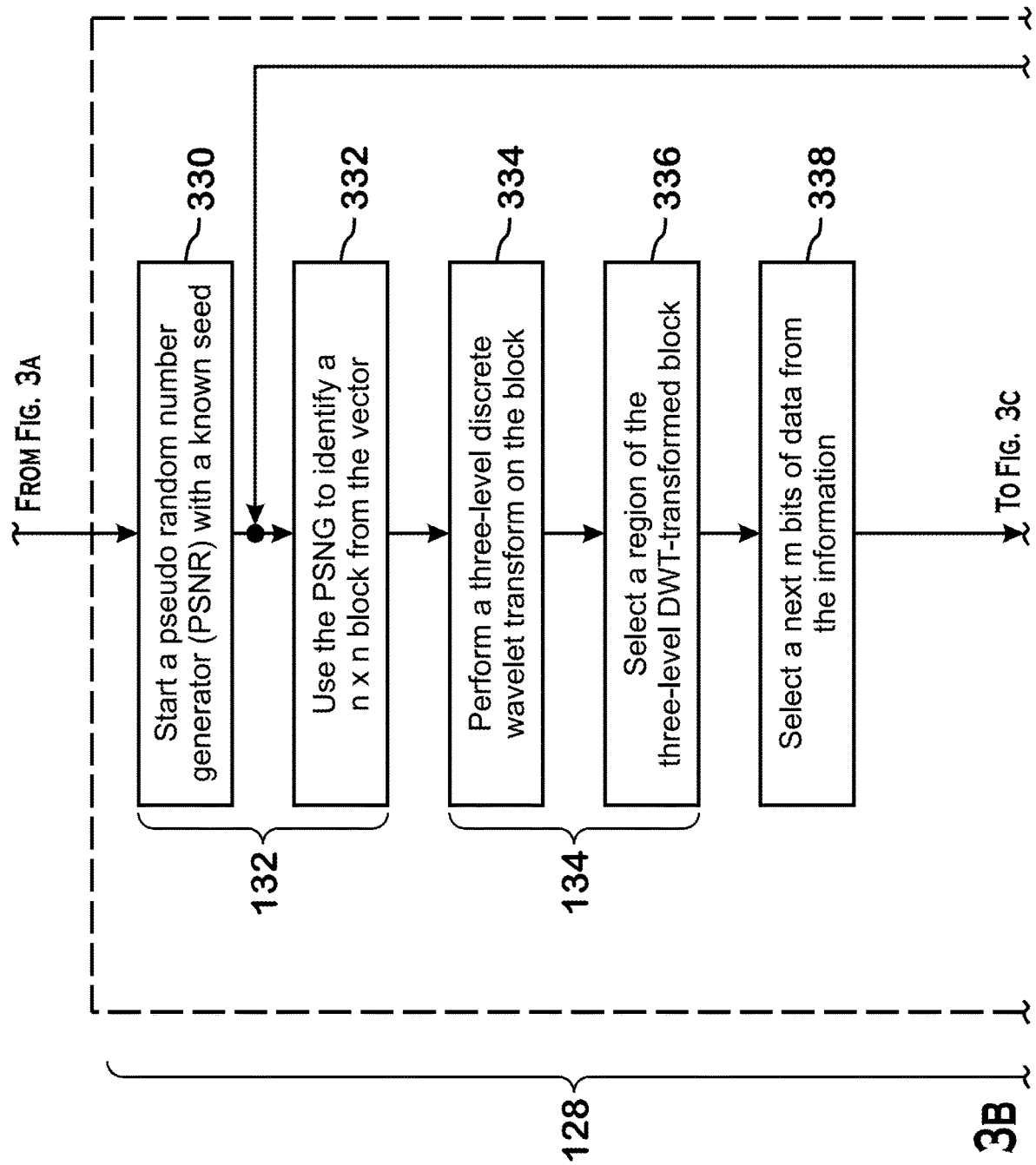
Figure 3C:
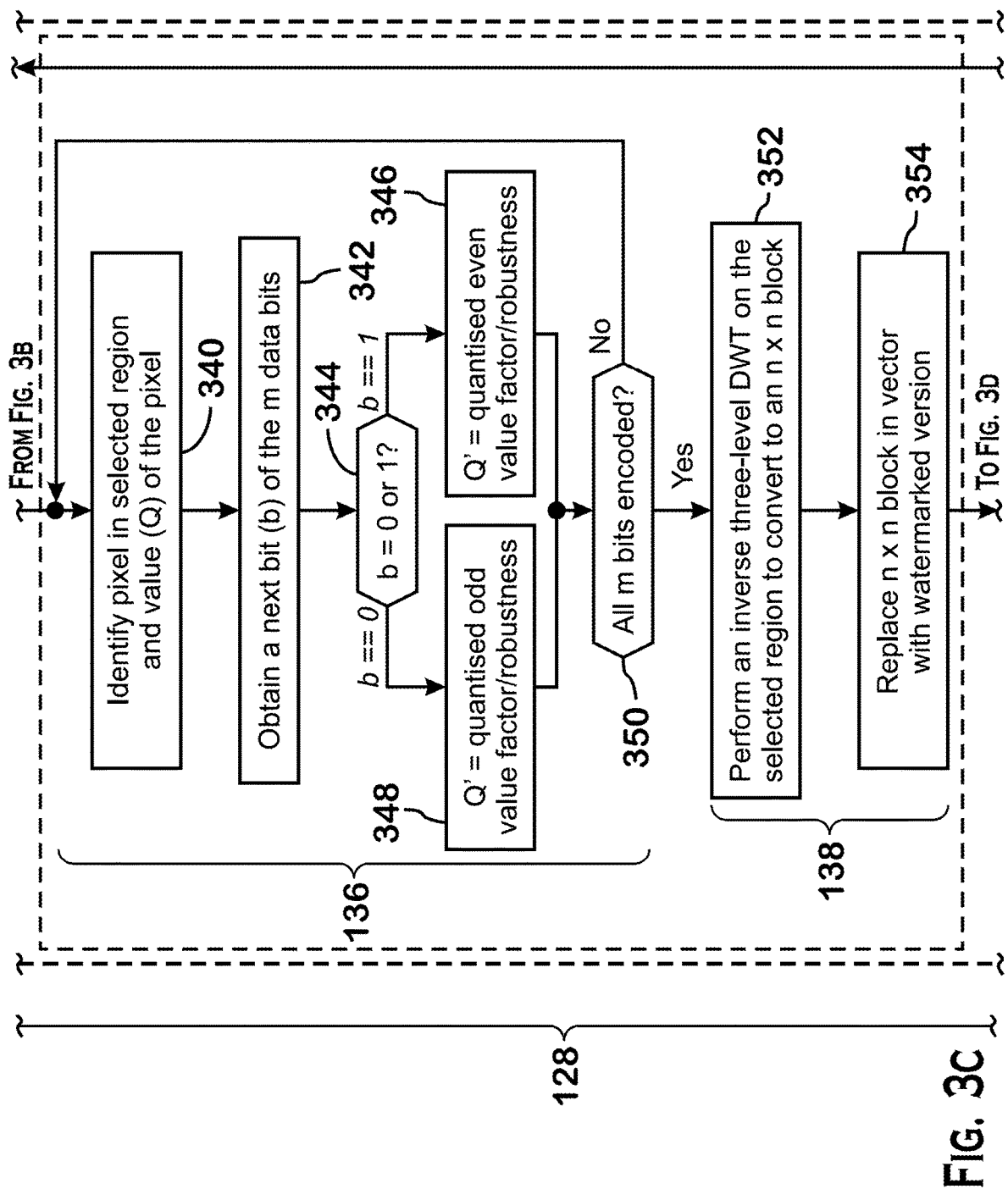
Figure 3D:
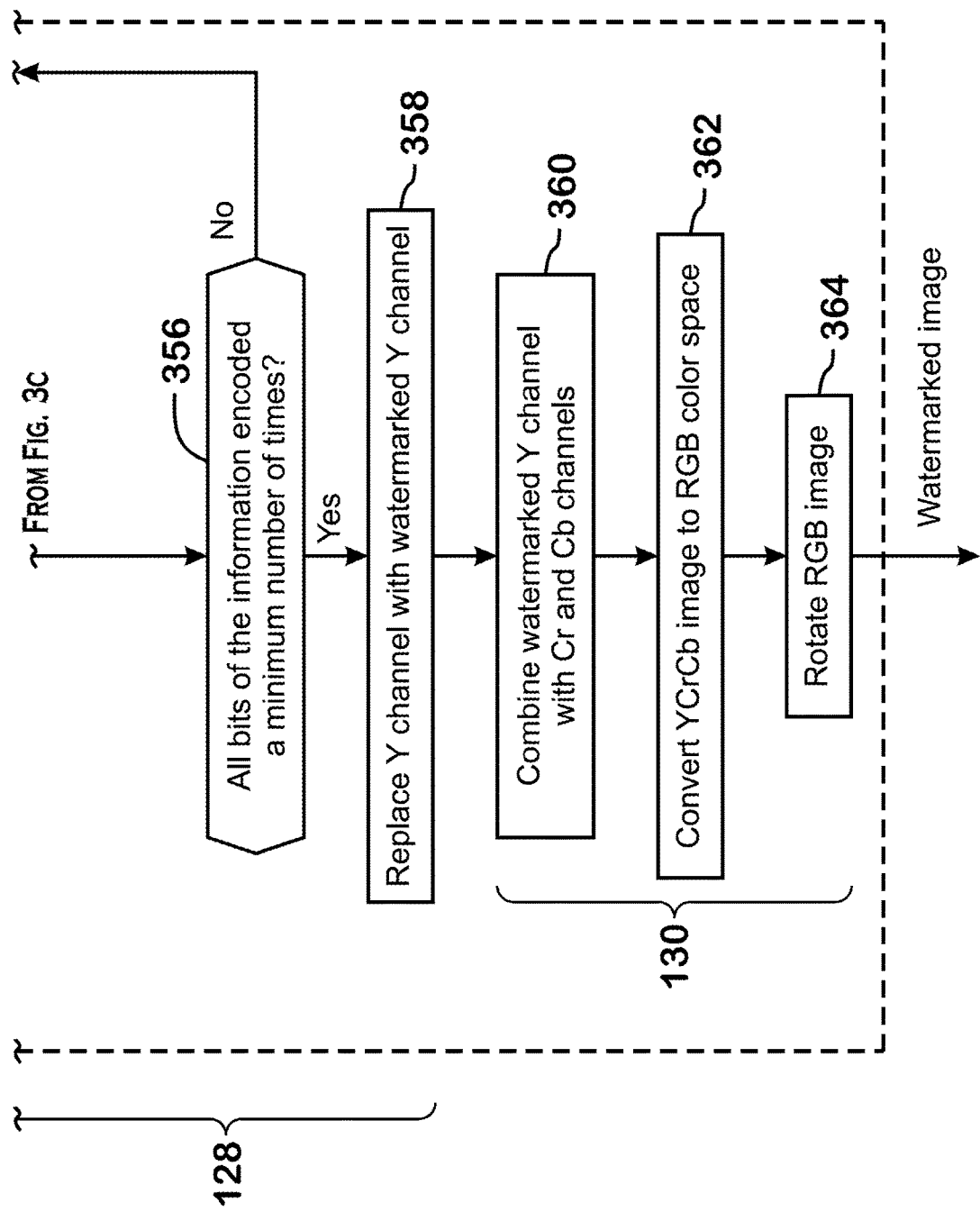

FIG. 2B shows substages of the encoding stage 128. The encoding stage 128 includes a block selection substage 132, a frequency transformation substage 134, an embedding substage 136 and an inverse frequency transformation substage 138.

The block selection substage 132 may select a block of the preprocessed image in which the preprocessed information or a portion thereof is to be embedded. The frequency transformation substage 134 may transform the selected block from a spatial domain to a frequency domain. The embedding substage 136 may embed the preprocessed information or the portion thereof in the frequency domain representation of the selected block. The inverse frequency transformation substage 138 may transform the frequency domain representation of the selected block back to the spatial domain. As described herein, the spatial domain representation is provided as image data to the post-processing stage 130 for generating the watermarked image 108.

Making reference to FIGS. 3A-3D a flow diagram of a method 300 of preprocessing the first image 106 through the image processing pipeline 114, preprocessing the information 112 through the information processing pipeline 116 and operation of the encoding stage 128 to encode the preprocessed first image with the preprocessed information is shown.

The first computer system 102, at 302, receives the first image 106 and the information 112. The first computer system 102, at 304, routes the first image 106 to the image processing pipeline 114 and routes the information 112 to the information processing pipeline 116. In the image processing pipeline 114, the first computer system 102 preprocesses the first image 106 through the image rotational adjustment stage 118. In the image rotational adjustment stage 118, the first computer system 102 performs rotation on the first image 106.

Preprocessing the first image 106 in the image rotational adjustment stage 118 is performed to identify a local vertical axis associated with the image and rotate the image such that the orientation of the image is reversed (or upside down or such that the image is rotated 180 degrees). The image rotational adjustment stage 118 advantageously standardizes image rotation for watermark encoding and detection. The image rotational adjustment stage 118 adds resiliency against rotation attacks in which adjustment in rotation may be used to escape watermark detection. The image rotational adjustment stage 118 uses features of the first image 106 to identify a local vertical axis that is inherent in view of the image. The local vertical axis is used to specify the orientation of the first image 106 during subsequent preprocessing and encoding.

As part of the image rotational adjustment stage 118, the first computer system 102 loads the first image 106 in the red, green and blue (RGB) color space at 306. The first computer system 102, at 308, performs feature detection on the first image to obtain feature vectors of the image. Feature detection associates each feature or element of a number of features or elements with a feature vector having a magnitude and a direction. The first computer system 102 may utilize any feature detection technique (for determining the feature vectors), such as speeded up robust features (SURF), scale-invariant feature transform (SIFT) or features from accelerated segment test (FAST), among others.

The first computer system 102, at 310, determines an average vector of the feature vectors of the image. The first computer system 102, at 312, rotates the image to cause the average vector to point along a central axis of the image. The rotation may be performed to a nearest quadrant. The quadrant may minimize an angle between the average vector and the central axis of the first image 106. Nearest-quadrant rotation retains the rectangular characteristics of the image.

Figure 4A:
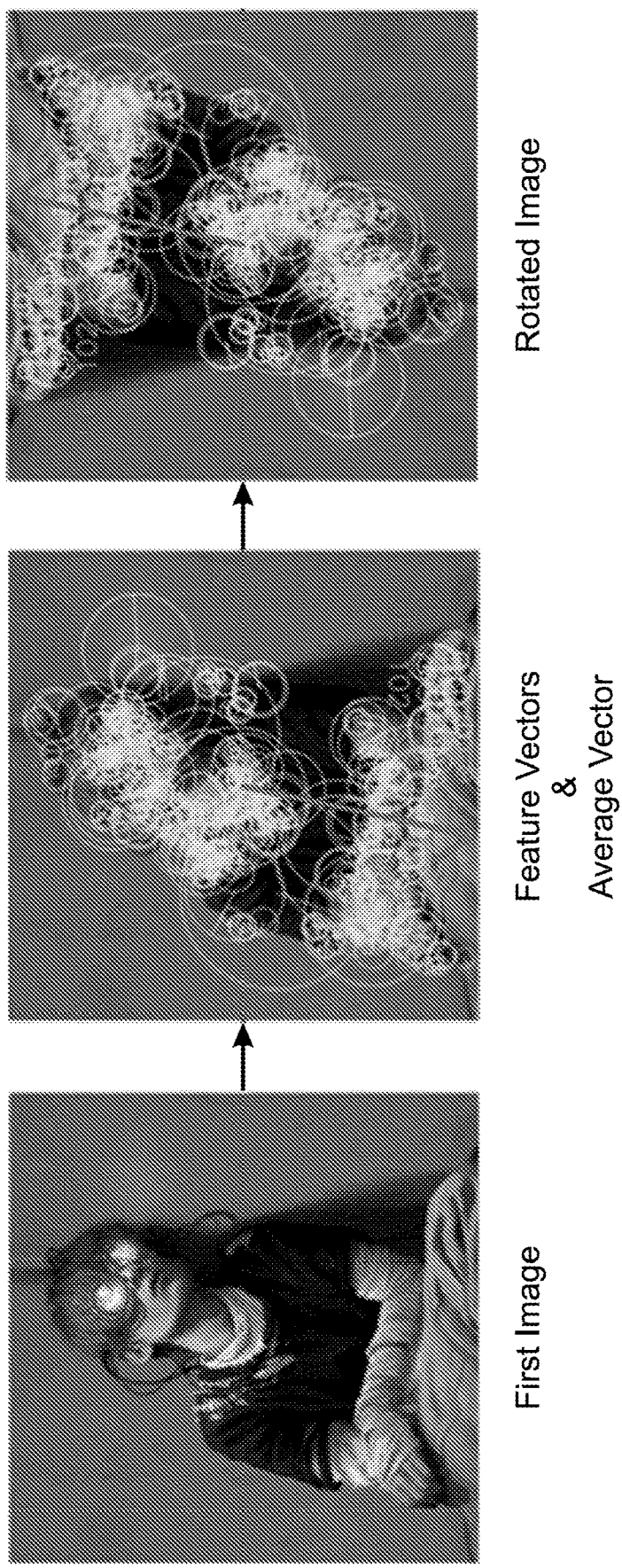
FIG. 4A shows an example of preprocessing the first image through the image processing pipeline.

FIG. 4A shows an example of preprocessing the first image 106 through the image processing pipeline 114. After determining the feature vectors of the first image 106, the first computer system 102 determines the average vector of the feature vectors. Then, the first computer system 102 rotates the first image 106 such that the average vector points in the direction of a central axis of the first image 106. The first computer system 102 approximates the rotation to the nearest quadrant so as to keep the first image 106 square or rectangular. In FIG. 4A, the first computer system 102 rotates the first image 106 by 180°. However, other options for rotation include 90° and 270°. Further, in the event that the average vector is aligned with the central axis, the rotation is 0°, and the image is not rotated. As described herein, feature detection sets a convention for the orientation of the first image 106 as the first image undergoes the processing described herein. Rotating the first image 106 lessens the perceptibility of the watermark as the human eye is less likely to notice the watermark if the watermark is embedded in the image while the image orientation is reversed in relation to the image's natural orientation.

Referring back to FIGS. 3A-3D, the color space conversion stage 120 is described. In the color space conversion stage 120, the first computer system 102, at 314, converts the image from the RGB color space to the YCrCb color space. In the YCrCb color space, Y is a luma channel component, Cr is a red-difference chroma channel component and Cb is a blue-difference chroma channel component. The information 112 may be embedded in the luma channel component (luminance channel) with a higher degree of modification and without raising the perceptibility of the changes to the human eye.

It is noted that the information may be embedded in a channel of the RGB color space. In particular, the information may be encoded in the green channel due to the fact that the green channel is associated with a more limited perceptibility than the red or blue channels. In this instance, RGB-to-YCrCb color space conversion may be forgone for the purposes of embedding the information.

In the channel extraction stage 122, the first computer system 102, at 316, extracts the Y channel from the YCrCb color space at 316. The first computer system 102, at 318, splits the Y channel into n×n bit blocks, where n may be any number of bits. For example, the block size may be 4×4 or 12×12 bits or larger. The block size may be 32×32 or 64×64. If the size of the block is smaller than 4×4 or 12×12 bits, then embedding the information 112 in the block may alter the characteristics of the blocks so as to become perceptible to the human eye. Alternatively, selecting a block size that is relatively large (such as 1024×1024) may not be sufficiently robust against attacks as to allow for decoding or retrieval of the embedded information. In addition, even though an n×n block is described herein, the blocks into which the image is divided may be rectangular (e.g., m×n) instead of being square.

Figure 4B:
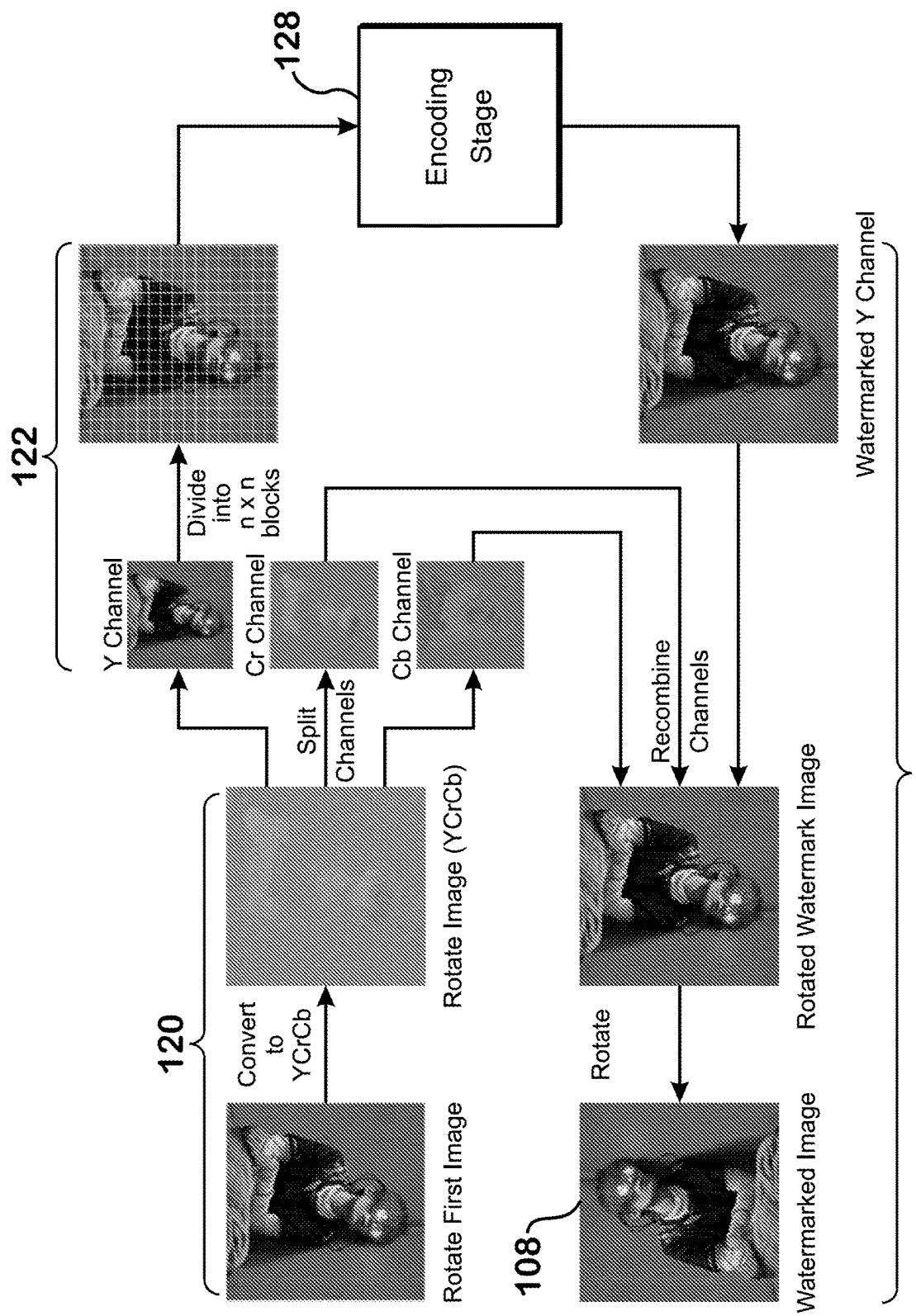
FIG. 4B illustratively shows generation of a watermarked image.

FIG. 4B illustratively shows generation of the watermarked image 108. As shown in FIG. 4B, the first computer system 102 converts the rotated first image from the RGB color space to the YCrCb color space in the color space conversion stage 120. The first computer system 102 extracts the Y channel from the YCrCb color space and splits the Y channel into n×n bit blocks in the channel extraction stage 122.

Referring back to FIGS. 3A-3D, the validation and compression stages 124, 126 of the information processing pipeline 116 are configured for preprocessing a decentralized identifier (DID). A DID is a globally-unique persistent identifier. An example DID is defined by the World Wide Web Consortium (W3C) Proposed Recommendation 1.0. A DID may have the form of did:example:12345abde. The 'did' in the first portion of the DID is a Uniform Resource Identifier (URI) scheme identifier. The 'example' in the second portion of the DID identifies a "DID method," which is a specific scheme used to generate a specific identifier. The third portion of the DID is the specific identifier associated with the "DID method." A DID may be generated under the Creative Rights Initiative of Wacom Co., Ltd. (as the "DID method") and may have the form of did:cri:12345abde.

In the validation stage 124, the first computer system 102, at 320, determines whether the information is a valid DID.

Determining whether the information is a valid DID may include determining whether the information has the format of a DID and/or determining whether the third portion (the specific identifier) is a valid identifier (for example, of a creative work that is sought to be watermarked). If a negative determination is made, the first computer system 102, at 322, declared that the information does not have a supported format, which ends the preprocessing.

If a positive determination is made, the first computer system 102 preprocesses the information per the compression stage 126. In the compression stage 126, the first computer system 102 removes the first and second portions of the information at 324. The first computer system 102 retains the third portion (the specific identifier) of the information. The first computer system 102, compresses the information at 326. For example, in the event that the third portion (the specific identifier) has a Unicode Transformation Format-8 (UTF-8) format, the first computer system 102 may convert each character into four bits. Each character may be represented in UTF-8 by one to four bytes. Conversion to four bits results in reducing the representation by one eighth to one half. The third portion may be 32 characters, which when converted to four bits per character yields an output of 128 bits.

At 328, the first computer system 102 encodes the information using a channel encoder. The channel encoder may be a convolutional encoder. Channel encoding may add parity bits or checksums to the information to enable error recovery. Because the convolutional encoder is sliding, a time-invariant trellis decoder may be used at the decoding end. The trellis decoder enables maximum likelihood decoding.

In the encoding stage 128, the first computer system 102 performs block selection on a vector of nxn-bit Y channel blocks as part of the block selection substage 132. The first computer system 102, at 330, starts a pseudo random number generator (PRNG) with a known seed. The seed may be known to the second computer system 104. Accordingly, at decoding, the second computer system 104 may use the same seed to identify blocks in which the information or a portion thereof is watermarked for recovery of the information. When seeded with the same value, the PRNG generates the same series of numbers over respective iterations.

The first computer system 102, at 332, uses the PRNG to identify a next nxn block from the vector for embedding information therein. In a first iteration, the next nxn block is a first nxn block of the vector to be selected for embedding information. Use of the PRNG distributes and randomizes the watermark across the Y channel of the first image 106.

It is noted that, use of the PRNG may be forgone. Alternatively, a block at (or proximate to) a center of the Y channel is identified and used to embed information therein. Subsequent blocks may be identified based on a pattern, such as a spiral pattern, starting from the center and moving outward to an edge or periphery of the Y channel. Prioritizing blocks at or near a spatial center of the image is advantageous in that the blocks are less likely to be subject to cropping. The blocks are more likely to be retained as the image is distributed or shared and, thus, more likely to be subsequently available for watermark detection.

Further, a feature-based identification may be used to identify blocks to encode with information. The nxn blocks of the Y channel may be ordered depending on a strength of features within a block. A block with the highest strength of features may be selected first. The selection of subsequent blocks may proceed in descending order of feature strength.

Alternatively, a feature-based identification may be used to identify one block with the greatest feature strength (as determined by a feature detector). The block with the greatest feature strength may be deemed to be a center of the image and may be selected for encoding. Selection of subsequent blocks may be performed in a spiral or circular fashion away from the first block and towards the borders of the Y channel of the image.

In frequency transformation substage 134, the first computer system 102 performs a frequency transformation on the nxn block to generate a frequency domain representation of the block. Although a discrete wavelet transform (DWT) is described herein, the techniques described herein may be used for any type of frequency domain transformation. The first computer system 102, at 334, performs a three-level discrete wavelet transform on the block. The first computer system 102 perform the three-level DWT successively.

Figure 5:
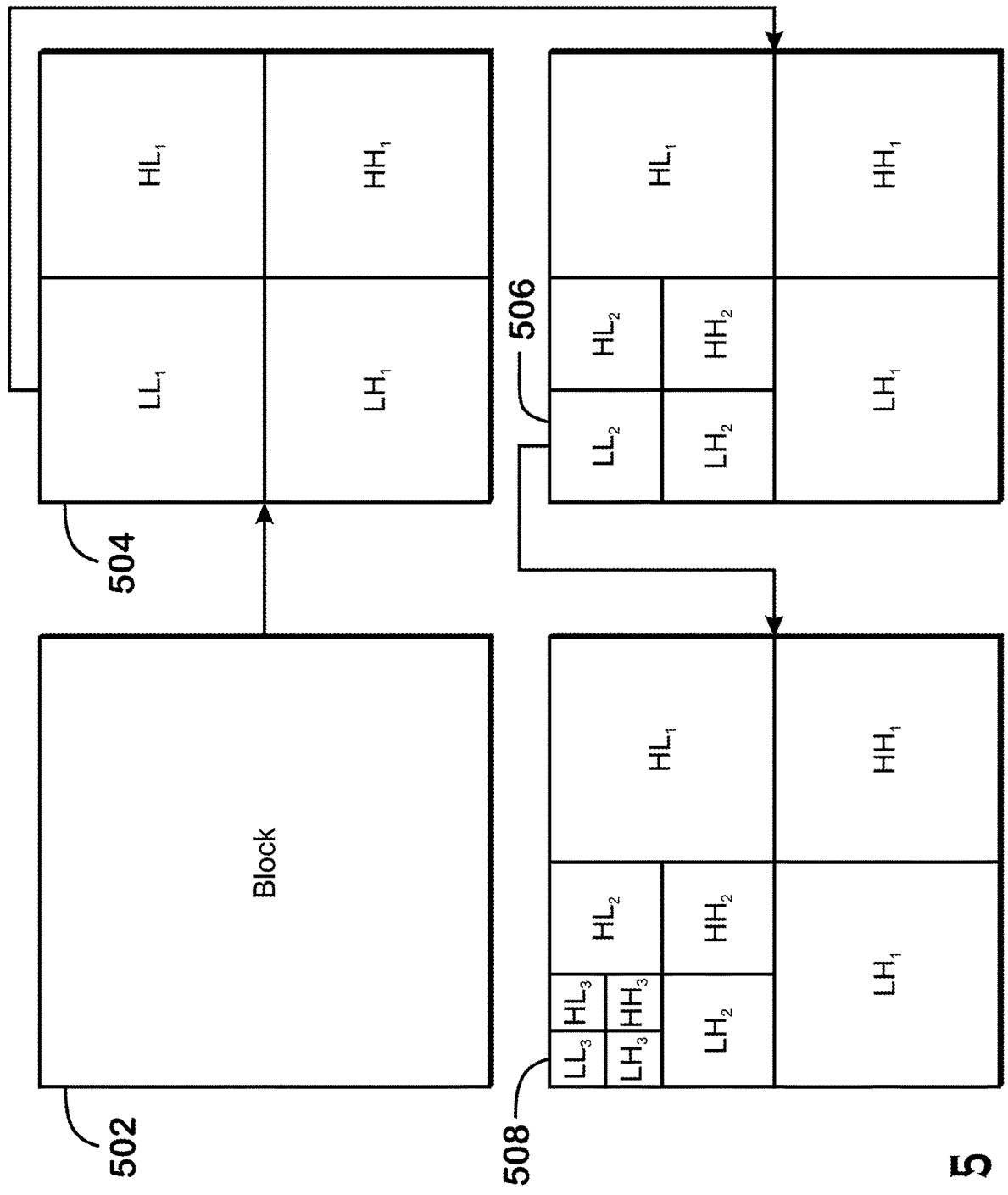
FIG. 5 shows an example of a three-level discrete wavelet transform.

FIG. 5 shows an example of three-level DWT. The first computer system 102, in a first operation, performs a DWT on a block 502. The first computer system 102 then selects a first region 504 of the DWT-transformed block. The first region 504 may be a region including low frequency parts of the two dimensions of the DWT-transformed block (denoted '$LL_1$'). The DWT-transformed block may include, in addition to the LL region, an HH region including high frequency parts of the two dimensions, an LH region including a low frequency part of a first dimension and a high frequency part of a second dimension and an HL region including a high frequency part of the first dimension and a low frequency part of the second dimension. The first computer system 102, in a second operation, performs a DWT on the first region 504. The first computer system 102 then selects a second region 506 ('$LL_2$') of the twice-transformed block. The second region 506 may again be the LL region. The first computer system 102, in a third operation, performs a DWT on the second region 506. The first computer system 102 selects a third region 508 ('$LL_3$') that is the LL region of the transformed block. Selection of the third region 508 for information encoding is more resilient to compression attacks. That is due to the fact the compression algorithms utilize the third region 508 for compressing image data. Accordingly, placement of the encoded information or watermark in the third region 508 makes it more likely that the watermark survives compression.

Referring back to FIGS. 3A-3D, the first computer system 102, at 336, selects a region of the DWT-transformed block. The first computer system 102, at 338, selects a next m bits of data from the information. For each nxn block, the first computer system 102 may select m bits of data to encode in the block, whereby m may be eight, for example. The information may be provided from the information processing pipeline 116 or compression stage 126 thereof as described herein. In the encoding stage 128, the first computer system 102 encodes the region with the m bits of data.

It is noted that each set of m bits of data may be encoded a minimum number of times (z) as described herein. The first computer system 102, at 338, may track the number of times that the set of m bits has been selected and determine whether the set of m bits has been selected the minimum number of times (z). The first computer system 102 may select a different set of m bits in response to determining that a previously selected set of m bits has been selected and encoded the minimum number of times (z).

In the encoding stage 128, the first computer system 102, at 340, identifies a pixel of the selected region (of the DWT-transformed block) and value (Q) of the pixel. The first computer system 102, at 342, obtains a next bit (b) of the m data bits. The positions of the pixels used to encode the m data bits may be pre-determined or pre-specified. For any region, the first computer system 102 may be configured with the pixel positions to select for encoding the m data bits. The first computer system 102, at 344, determines whether the bit (b) of the m data bits is a logical zero or a logical one. The first computer system 102 then modifies the value (Q) of the pixel depending on the state of the bit (b).

The first computer system 102 is configured with a robustness factor. The robustness factor sets a relationship between robustness and imperceptibility. The robustness factor is negatively correlated with imperceptibility. A higher robustness factor yields more robust watermarking but makes a watermark more susceptible to perceptibility.

In response to determining that the bit (b) of the m data bits is a logical one, the first computer system 102, at 346, quantizes the value (Q) of the selected region to an even value (for example, closest even value or ceiling or floor even value). The first computer system 102 also divides the even value by the robustness factor to yield a replacement value (Q'). The first computer system 102 replaces the value (Q) of the selected region with the replacement value (Q').

In response to determining that the bit (b) of the m data bits is a logical zero, the first computer system 102, at 346, quantizes the value (Q) of the selected region to an odd value (for example, closest odd value or ceiling or floor odd value). The first computer system 102 divides the odd value by the robustness factor to yield a replacement value (Q'). The first computer system 102 replaces the value (Q) of the selected region with the replacement value (Q').

The bit (b) is encoded by changing a pixel of the transformed region according to different levels. A logical one is indicated by setting the pixel of the transformed region to a ratio of an even quantization and the robustness factor. A logical zero is indicated by setting the pixel of the transformed region to a ratio of an odd quantization and the robustness factor. It is noted that the convention may be reversed, and the even quantization may be used for the logical zero and the odd quantization may be used for the logical one. Quantization to odd and even values is resilient and also imperceptible in that it has a small footprint and does not dramatically alter the characteristics of the block.

The first computer system 102, at 350, determines whether the m bits of data selected from the information have been encoded using the robustness factor quantization. In response to a negative determination, the first computer system 102 reverts to obtaining a next pixel and a next value (Q) thereof from the selected region of the DWT-transformed block and obtaining a next bit (b) to encode using the next value (Q). The first computer system 102 may make a positive determination at 350 if the first computer system 102 encoded all m selected bits in a respective m pixel positions using the even and odd quantization described herein.

In response to making a positive determination, the first computer system 102, at 352, performs an inverse three-level DWT on the selected region to convert the selected region back to an n×n block in spatial format. The first computer system 102, at 352, replaces the n×n block (identified at 332) in the vector with the watermarked version of the n×n block generated at 352.

The first computer system 102, at 356, determines whether all bits of the information have been encoded the minimum number of times (z). If a negative determination is made, the first computer system 102 reverts to identifying a next n×n block in the vector for embedding the information. The minimum number of times (z) may be an odd number. Encoding bits of the information (or each bit of the information) a minimum number of z times allows for error correction or a checksum to be performed. Utilization of an odd number of times allows for a simple majority voting technique to be used at a decoding end to decode the information. The embedding substage 136 and the inverse frequency transformation substage 138 are performed the minimum number of times (z) for each set of m bits. For example, if the information output by information processing pipeline 116 is 160 bit (or twenty sets of m=8 bits) and the minimum number of times is three (z=3), then the embedding substage 136 and the inverse frequency transformation substage 138 are operated sixty times (or 20*3). In this case, the first computer system 102 identifies sixty n×n blocks (at 332). The first computer system 102 encodes the same set of eight bits in three different n×n blocks.

If a positive determination is made at 356, the first computer system 102, at 358, replaces the Y channel of the first image 106 with the watermarked Y channel. In the watermarked Y channel, the n×n blocks identified by the first computer system 102 (at 332) are replaced with the n×n blocks generated by the first computer system 102 (at 352), respectively.

In the post-processing stage 130, the first computer system 102, at 360, combines the watermarked Y channel with the Cr and Cb channels of the first image 106. The first computer system 102 replaces the Y channel of the first image 106 with the watermarked Y channel. The first computer system 102, at 362, converts the YCrCb image to an RGB color space. The first computer system 102, at 364, rotates the RGB image to generate the watermarked image 108. The rotation may have the same angle and opposite direction as the rotation performed during the image rotational adjustment stage 118. In the post-processing stage, the first computer system 102 reverses the preprocessing performed during the image processing pipeline 114. In the post-processing stage, the first computer system 102 causes the watermarked image 108 to have the same orientation and color space as the first image 106. Referring back to FIG. 4B, combining the watermarked Y channel with the Cr and Cb channels of the first image 106 and image rotation, which are performed after the encoding stage 128, are shown.

Figure 6:
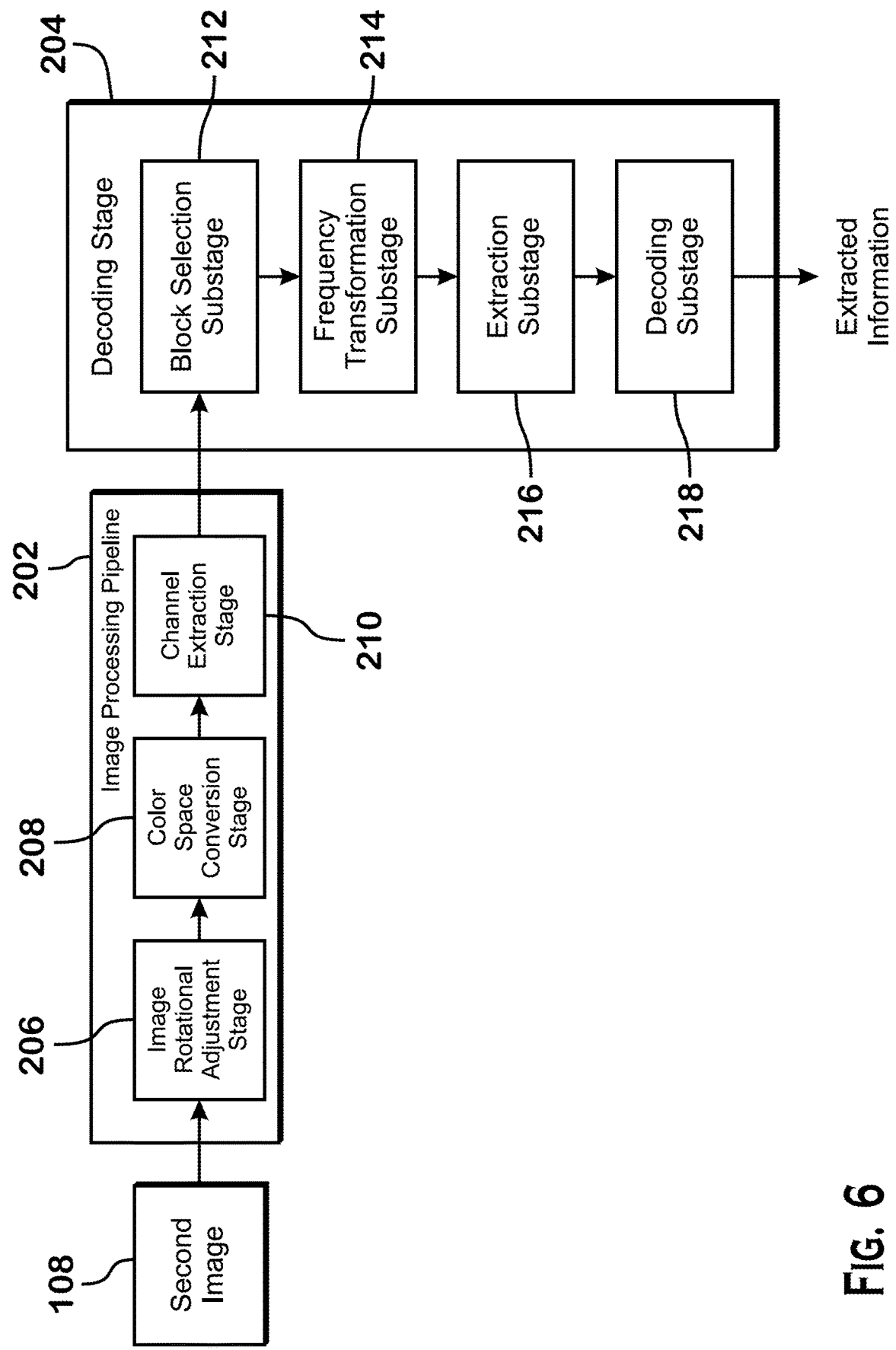
FIG. 6 shows stages of extracting watermark information from a second image.

FIG. 6 shows stages of extracting watermark information from the second image 110. As described herein, the watermarked image 108 may be disseminated or distributed. In dissemination or distribution, the watermarked image 108 may be modified (through cropping or compression, among others). The modification may result in the second image 110. Alternatively, the second image 110 may be the same as the watermarked image 108 having been shared or transmitted.

The stages of extracting watermark information may be performed by the second computer system 104. The stages include an image processing pipeline 202 and a decoding stage 204. The image processing pipeline 202 includes an image rotational adjustment stage 206, a color space conversion stage 208 and a channel extraction stage 210. The decoding stage 204 includes a block selection substage 212, a frequency transformation substage 214, an extraction substage 216 and a decoding substage 218.

The image processing pipeline 202 is similar to the image processing pipeline 114 described herein with reference to FIGS. 2 and 3A-3D. The second computer system 104 processes the second image 110 through the image processing pipeline 202 to obtain, for the second image 110, a vector of n×n bit blocks for a Y channel of the second image 110.

In the decoding stage 204, the second computer system 104 processes the vector of n×n bit blocks for the Y channel. The block selection substage 212 and the frequency transformation substage 214 of the decoding stage 204 are similar to the block selection substage 132 and the frequency transformation substage 134, respectively, of the encoding stage 128 described herein with reference to FIGS. 2 and 3A-3D. The extraction substage 216 and the decoding substage 218 are utilized by the second computer system 104 to decode and extract encoded information.

Figure 7A:
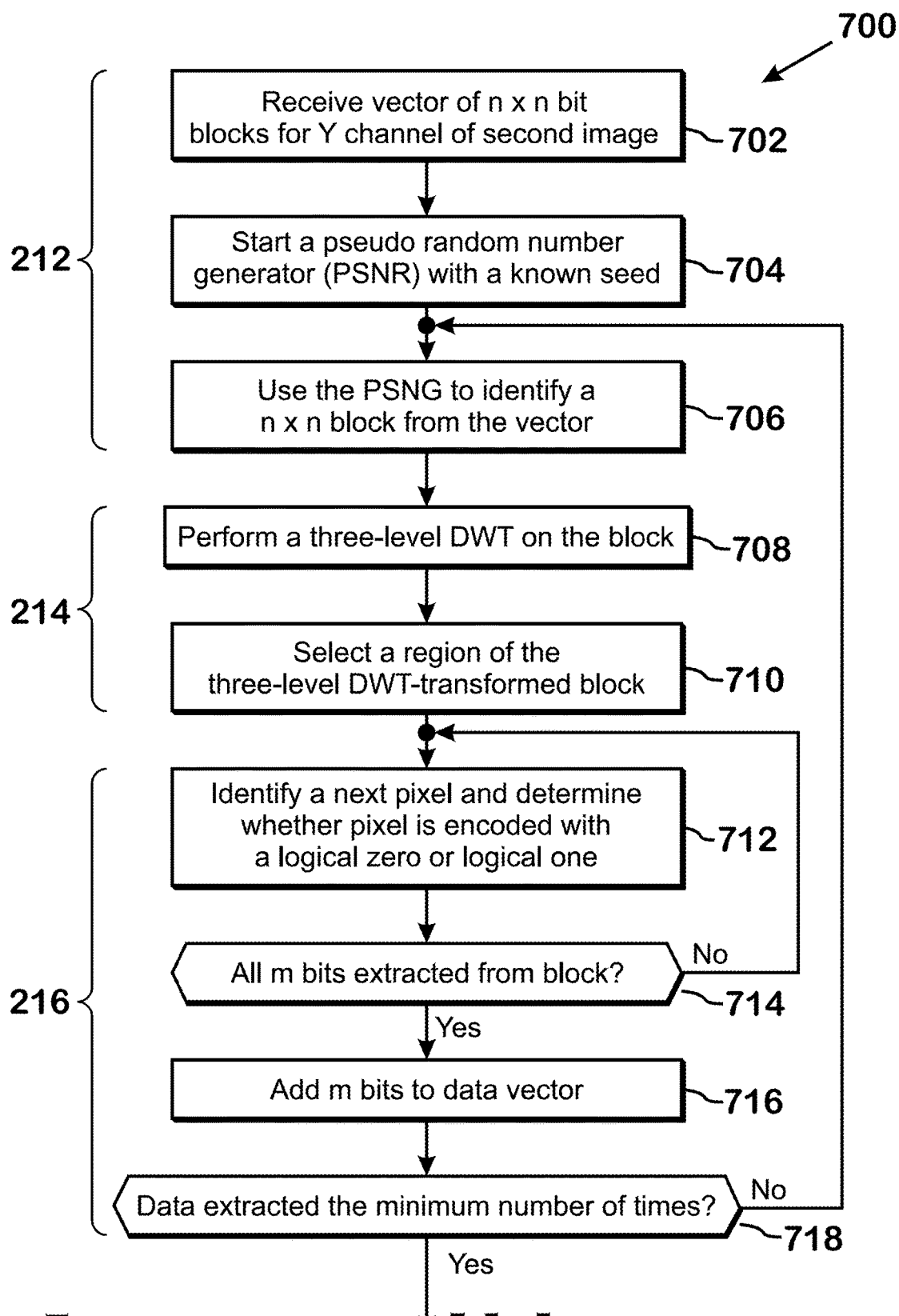
FIGS. 7A and 7B show a flow diagram of a method of extracting information from the second image.
Figure 7B:
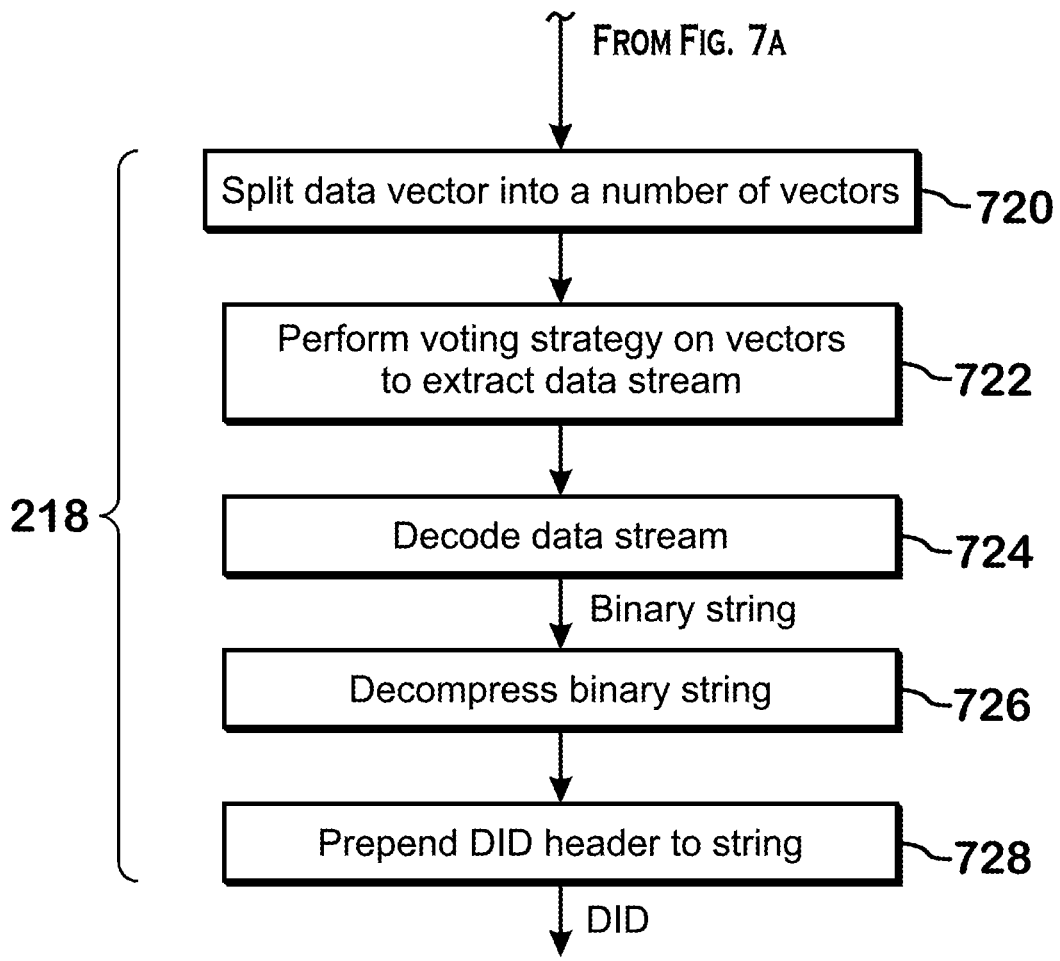

FIGS. 7A and 7B show a flow diagram of a method 700 of extracting information from the second image 110. In the block selection substage 212, the second computer system 104, at 702, receives the vector of n×n bit blocks for the Y channel of the second image 110. The second computer system 104, at 704, starts a PRNG with a known seed. The seed may be the same as the seed used by the first computer system 102 to perform block selection. Alternatively, if a different block selection techniques is used by the first computer system 102, the second computer system 104 may utilize the same technique.

The second computer system 104, at 706, uses the PRNG to identify a next n×n block of the vector to extract information embedded therein. In a first iteration, the next n×n block is a first n×n block of the vector to be selected for information extraction. As described herein, as an alternative to random information embedding, a block at (or proximate to) a center of the Y channel may be identified. Subsequent blocks may be identified based on a pattern, such as a spiral pattern, starting from the center and moving outward to an edge or periphery of the Y channel.

In the frequency transformation substage 214, the second computer system 104 performs a frequency transformation on the n×n block to generate a frequency domain representation of the block. The frequency transformation is the same used by the first computer system 102 in transforming the block for information embedding. The second computer system 104, at 708, performs a three-level discrete wavelet transform on the block as described herein. The second computer system 104, at 710, selects a region of the DWT-transformed block, whereby the region may be the $LL_3$ region described herein.

In the extraction substage 216, the second computer system 104, at 708, identifies a next pixel and determines whether the pixel is encoded with a logical zero of a logical one. The position of the pixels of the n×n block and order of encoding the pixels as performed by the first computer system 102 is known to the second computer system 104 (and, for example, established by convention). The second computer system 104 identifies a level associated with the pixel and multiplies the level by the robustness factor. If the product of the multiplication is an odd value, then the encoded bit is a logical zero, and if the product of the multiplication is an even value, then the encoded bit is a logical one.

In response to identifying the encoded bit, the second computer system 104, at 714, determines whether all m bits are extracted from the block. If a negative determination is made, the second computer system 104 reverts to identifying another pixel of the block to extract an encoded bit therefrom. The other pixel may be a next position in order of position according to which the first computer system 102 encodes data into n×n blocks. If a positive determination is made and all m bits are retrieved from the block, the second computer system 104, at 716, adds the m bits to an extracted data vector.

Then, the second computer system 104, at 718, determines whether data has been extracted the minimum number of times (z). The extracted data is expected to correspond to embedded information. As described herein, the size of the information embedded in the watermarked image may be fixed and known to the second computer system 104. The information may include a number of bits (for example, 128 bits) corresponding to an identifier and a fixed number of parity bit for error detection or correction. The information is embedded multiple times by the first computer system (the minimum number of times (z)). The second computer system 104 may then retrieve data corresponding to the product of the number of bits of the information and the minimum number of times (z).

If a negative determination is made at 718, the second computer system 104 reverts to using the PRNG to identify a next block from which to retrieve m more bits. If a positive determination is made, the method 700 proceeds to the decoding substage 218. In the decoding substage, the second computer system 104, at 720, splits the data vector in a number of vectors (w), where the number of vectors (w) corresponds to the minimum number of times (z). The vectors may each be of equal size. The size corresponds to the size of the encoded information.

At 722, the second computer system 104 performs a voting strategy on the vectors to extract a data stream. The voting strategy may be a majority voting strategy. For each index position of the vectors, the second computer system 104 determines the most common value of the vectors. The number of vectors (w) and the minimum number of times (z) may be odd numbers (for example, three or five). The most common value is determined by majority voting. For example, when w=z=3 and the tenth position of a first vector is 0, the tenth position of a second vector is 0 and the tenth position of a third vector is 1, then the most common value for the tenth position is 0. Accordingly, second computer system 104 determines that the tenth position of the data stream is 0. The voting strategy as well as the use of parity bits and channel encoding is used to correct errors introduced in the encoded information through the sharing of the watermarked image 108 or conversion of the watermarked image 108 to the second image 110.

As described herein, channel encoding is performed on the first image 106. The second computer system 104, at 724, decodes the data stream. The second computer system 104 may use a branch decoding trellis (for example, maximum likelihood decoder or a Viterbi channel decoder).

Figure 8:
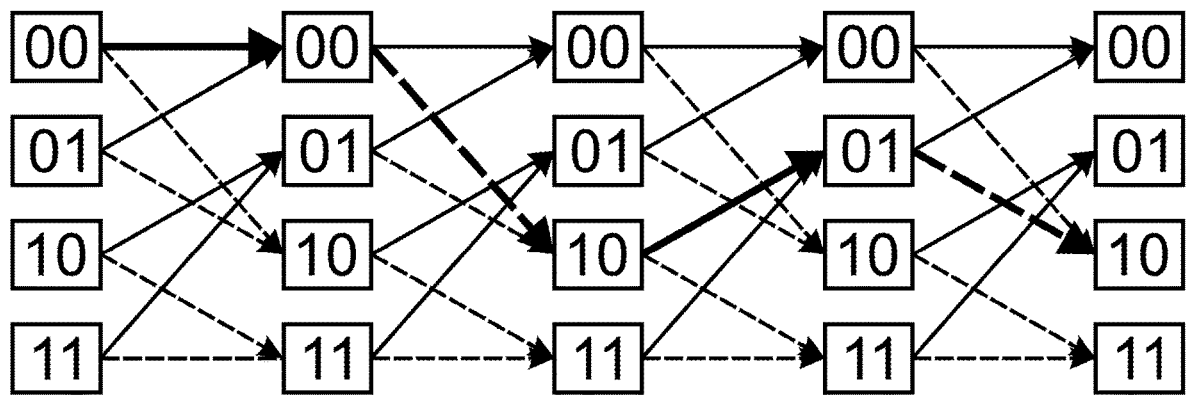
FIG. 8 shows an example of a branch decoding trellis.

FIG. 8 shows an example of a branch decoding trellis. The trellis is a time indexed state diagram. Each state transition is associated with an input bit ($x_i$) and corresponds to a forward step in the trellis. A path through the trellis is shown in bold, and solid lines indicate transitions where the input bit ($x_i$) is 0 and dashed lines indicate transitions where the input bit ($x_i$) is 1. Each branch of the trellis has a branch metric and a path metric represents the squared Euclidean distance. Paths that diverge and remerge with another path that has a smaller path metric are systematically eliminated (or pruned). The second computer system 104 retains a minimum path.

When a next bit is sampled, path metrics for the two paths leaving each state at a previous sampling time are calculated by adding branch metrics to previous state metrics. Two path metrics entering each state at the current sampling time are compared and the path with the minimum metric is selected as a survivor path. The second computer system 104 processes all bits of the data stream as input bits to determine a most likely (maximum likelihood) path corresponding to a most likely binary string.

Referring back to FIGS. 7A and 7B, the second computer system 104, at 726, decompresses the binary string resulting from decoding the data stream. As described herein with reference to FIGS. 3A-3D, the first computer system 102 compresses the information before channel encoding. Accordingly, the second computer system 104 reverses the compression. The second computer system 104 may produce a binary string having a UTF-8 format. The second computer system 104, at 728, prepends the binary string with a DID header. The DID header may be the same DID header that the first computer system 102 trimmed during encoding. The second computer system 104 determines a DID embedded in the second image 110. Consequently, the second computer system 104 determines whether the second image 110 includes a watermark corresponding to a work or asset. The determination may be used to prevent misuse of the work or asset and link the second image 110 to the work or asset. An artist or creator may have strong evidence that the second image 110 is their work. The determination may be used by the artist or creator for an infringement claim, among others. It is noted that the techniques described herein may be used to watermark and detect watermarks in video and constituent images thereof.

Figure 9:
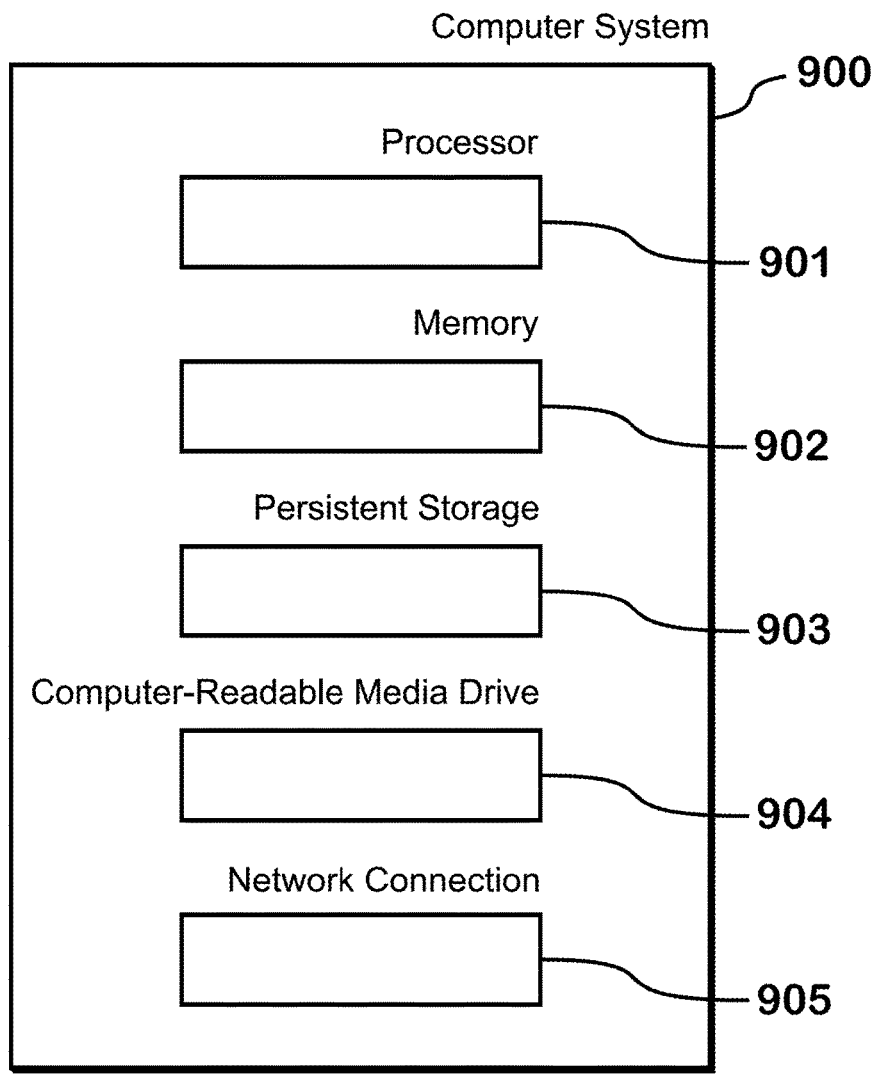
FIG. 9 shows a block diagram of a computer system.

FIG. 9 shows a block diagram of a computer system 900. The first computer system 102 and the second computer system 104 described herein may be similarly configured as the computer system 800. In various embodiments, the computer system 900 may be one or more server computer systems, cloud computing platforms or virtual machines, desktop computer systems, laptop computer systems, netbooks, mobile phones, personal digital assistants, televisions, cameras, automobile computers, electronic media players, etc.

In various embodiments, the computer system 900 includes a processor 901 or central processing unit ("CPU") for executing computer programs or executable instruction. The first computer system 102 may use the processor 901 to perform processing through the image and information processing pipelines 114, 116 and encoding stage 128 described herein. The second computer system 104 may use the processor 901 to perform processing through the image processing pipeline 202 and decoding stage 204 described herein.

The computer system 900 includes a computer memory 902 for storing the programs or executable instruction and data. The first and second computer systems 102, 104 may respectively store executable instructions representing the pipeline processing described herein. The first and second computer systems 102, 104 may respectively store executable instructions representing the encoding and decoding stage described herein. The processor 901 of the first computer system 102 may execute the executable instructions to perform the operations described herein in relation to the first computer system 102. The processor 901 of the second computer system 104 may execute the executable instructions to perform the operations described herein in relation to the second computer system 104.

The computer memory 902 stores an operating system including a kernel, and device drivers. The computer system 900 includes a persistent storage device 903, such as a hard drive or flash drive for persistently storing programs and data, a computer-readable media drive 904, such as a floppy, CD-ROM, or DVD drive, for reading programs and data stored on a computer-readable medium and a network connection 905 for connecting the computer system 900 to other computer systems to send and/or receive data, such as via the Internet or another network and its networking hardware, such as switches, routers, repeaters, electrical cables and optical fibers, light emitters and receivers, radio transmitters and receivers, and the like. The network connection 905 may be modem or radio. The first computer system 102 may output, over the network connection 905, the watermarked image 108 for distribution. The second computer system 104 may receive, over the network connection 905, the second image 110 for determining whether the second image 110 is embedded with information (or a particular DID).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer system, comprising:
a first processor; and
memory having stored thereon executable instructions that, when executed by the first processor, cause the first processor to:
  receive a first image and receive identifier information for embedding in the first image;
  preprocess the first image to produce a preprocessed first image;
  preprocess the identifier information by at least channel-encoding the identifier information to produce preprocessed identifier information including a plurality of sets of bits;
  embed the preprocessed identifier information in the preprocessed first image by at least:
    selecting a plurality of blocks of the preprocessed first image; and
    embedding in each block of the plurality of blocks a respective set of bits of the plurality of sets of bits, wherein each set of bits of the plurality of sets of bits is embedded in a minimum number of blocks of the plurality of blocks, wherein the minimum number of blocks is greater than one; and
  output the preprocessed first image, wherein the respective set of bits of the identifier information is embedded in each of the plurality of blocks of the preprocessed first image;
a second processor; and
memory having stored thereon executable instructions that, when executed by the second processor, cause the second processor to:
  modify or copy the preprocessed first image to produce a second image, wherein the respective set of bits of the identifier information is embedded in each block of the second image corresponding to each of the plurality of blocks of the preprocessed first image output; and
a third processor; and
memory having stored thereon executable instructions that, when executed by the third processor, cause the third processor to:
  output an indication of the identifier information extracted from the second image.

2. The computer system as claimed in claim 1, wherein the executable instructions cause the first processor to preprocess the first image by:
   rotating the first image by 90 degrees, 180 degrees or 270 degrees.

3. The computer system as claimed in claim 1, wherein the executable instructions cause the first processor to preprocess the first image by:
   performing feature detection on the first image to generate a plurality of feature vectors;
   determining an average feature vector of the plurality of feature vectors; and
   rotating the first image to a quadrant that minimizes an angle between the average feature vector and a central axis of the first image.

4. The computer system as claimed in claim 1, wherein the executable instructions cause the first processor to preprocess the first image by:
   obtaining the preprocessed first image as a luma channel component of the first image.

5. The computer system as claimed in claim 1,
   wherein the executable instructions cause the first processor to:
      frequency-transform the plurality of blocks to generate a plurality of frequency-transformed blocks, and
   wherein the executable instructions cause the first processor to embed in each block of the plurality of blocks a respective set of bits of the plurality of sets of bits by:
      embedding in each frequency-transformed block of the plurality of frequency-transformed blocks the respective set of bits of the plurality of sets of bits; and
      in response to embedding the plurality of sets of bits, inversely transforming the plurality of frequency-transformed blocks to a spatial domain.

6. The computer system as claimed in claim 1, wherein the executable instructions cause the first processor to:
   embed in a first block of the plurality of blocks a first set of bits of the plurality of sets of bits by at least:
      selecting a first bit of the first set of bits;
      selecting a pixel position in the first block;
      identifying a level of the pixel position; and
      quantizing the level of the pixel position depending on a logical state of the first bit.

7. The computer system as claimed in claim 6, wherein the executable instructions that cause the first processor to quantize the level of the pixel position depending on the logical state of the first bit cause the first processor to:
   in response to determining that the logical state of the first bit is a logical zero, quantize the level to one of: an odd value or an even value; and
   in response to determining that the logical state of the first bit is a logical one, quantize the level to the other of: the odd value or the even value.

8. The computer system as claimed in claim 7, wherein the executable instructions cause the first processor to:
   divide the quantized level of the pixel position by a robustness factor.

9. The computer system as claimed in claim 1, wherein the executable instructions cause the first processor to:
   generate a watermarked image based on embedding the preprocessed identifier information in the preprocessed first image; and
   cause the watermarked image to be output for distribution.

10. The computer system as claimed in claim 1, wherein the identifier information is a decentralized identifier defined by the World Wide Web Consortium (W3C) Proposed Recommendation 1.0.

11. The computer system as claimed in claim 1, wherein the executable instructions cause the first processor to preprocess the first image by:
   configuring an image processing pipeline including a plurality of image preprocessing stages;
   selecting one or more of the plurality of image preprocessing stages depending on contextual information associated with the first image, a property of the first image, an image type associated with the first image, or a preprocessing configuration; and
   preprocessing the first image through the selected one or more of the plurality of image preprocessing stages to produce the preprocessed first image.

12. The first computer system as claimed in claim 1, wherein the executable instructions cause the first processor to preprocess the identifier information by:
   configuring an information processing pipeline including a plurality of information preprocessing stages;
   selecting one or more of the plurality of information preprocessing stages depending on a type of the identifier information or a preprocessing configuration; and
   preprocessing the identifier information through the selected one or more of the plurality of information preprocessing stages to produce the preprocessed identifier information.

13. A method, comprising:
   receiving a first image and receiving identifier information for embedding in the first image;
   preprocessing the first image to produce a preprocessed first image;
   preprocessing the identifier information by at least channel-encoding the identifier information to produce preprocessed identifier information including a plurality of sets of bits;
   embedding the preprocessed identifier information in the preprocessed first image by at least:
      selecting a plurality of blocks of the preprocessed first image; and
      embedding in each block of the plurality of blocks a respective set of bits of the plurality of sets of bits, wherein each set of bits of the plurality of sets of bits is embedded in a minimum number of blocks of the plurality of blocks, wherein the minimum number of blocks is greater than one; wherein the respective set of bits of the identifier information is embedded in each of the plurality of blocks of the preprocessed first image;
   modify or copy the preprocessed first image to produce a second image, wherein the respective set of bits of the identifier information is embedded in each block of the second image corresponding to each of the plurality of blocks of the preprocessed first image output; and
   output an indication of the identifier information extracted from the second image.

14. The method as claimed in claim 13, wherein preprocessing the first image includes:
   performing feature detection on the first image to generate a plurality of feature vectors;
   determining an average feature vector of the plurality of feature vectors; and
   rotating the first image to a quadrant that minimizes an angle between the average feature vector and a central axis of the first image.

15. The method as claimed in claim 13, wherein preprocessing the first image includes:
obtaining the preprocessed first image as a luma channel component of the first image.

16. The method as claimed in claim 13, comprising:
embedding in a first block of the plurality of blocks a first set of bits of the plurality of sets of bits by at least:
selecting a first bit of the first set of bits;
selecting a pixel position in the first block;
identifying a level of the pixel position; and
quantizing the level of the pixel position depending on a logical state of the first bit.

17. The method as claimed in claim 16, wherein quantizing the level of the pixel position depending on the logical state of the first bit includes:
in response to determining that the logical state of the first bit is a logical zero, quantizing the level to one of: an odd value or an even value; and
in response to determining that the logical state of the first bit is a logical one, quantizing the level to the other of: the odd value or the even value.

18. The method as claimed in claim 17, comprising:
dividing the quantized level of the pixel position by a robustness factor.

19. The method as claimed in claim 13, wherein preprocessing the first image includes:
configuring an image processing pipeline including a plurality of image preprocessing stages;
selecting one or more of the plurality of image preprocessing stages depending on contextual information associated with the first image, a property of the first image, an image type associated with the first image or a preprocessing configuration; and
preprocessing the first image through the selected one or more of the plurality of image preprocessing stages to produce the preprocessed first image.

20. The method as claimed in claim 13, wherein preprocessing the identifier information includes:
configuring an information processing pipeline including a plurality of information preprocessing stages;
selecting one or more of the plurality of information preprocessing stages depending on a type of the identifier information or a preprocessing configuration; and
preprocessing the identifier information through the selected one or more of the plurality of information preprocessing stages to produce the preprocessed identifier information.

21. The computer system as claimed in claim 1, wherein the modifying the preprocessed first image, by the second processor, includes editing, cropping, compression or format conversion of the preprocessed first image to produce the second image.

22. The method as claimed in claim 13, wherein the modifying the preprocessed first image includes editing, cropping, compression or format conversion of the preprocessed first image to produce the second image.

* * * * *